United States Patent Office 3,561,203
Patented Feb. 9, 1971

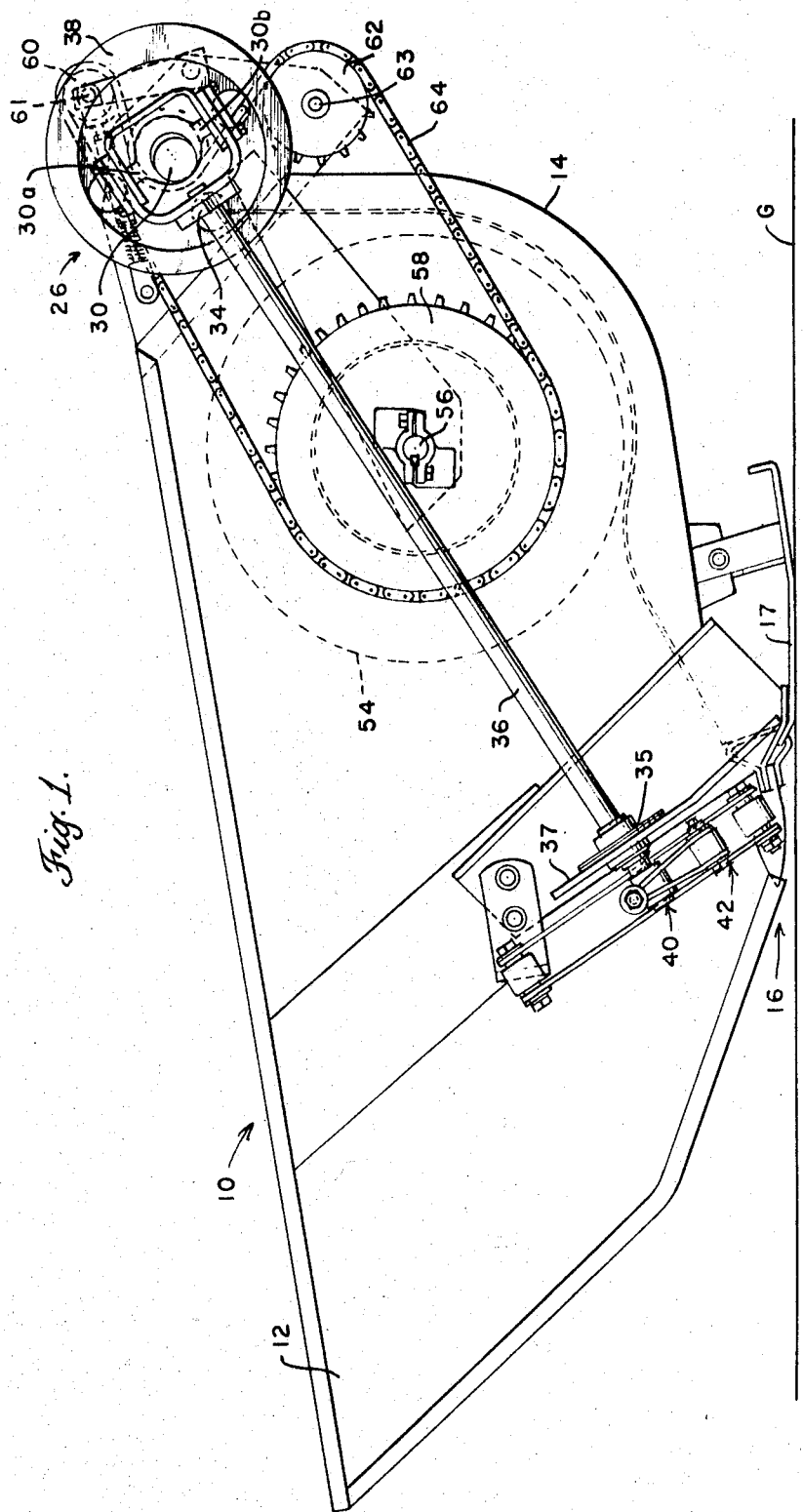

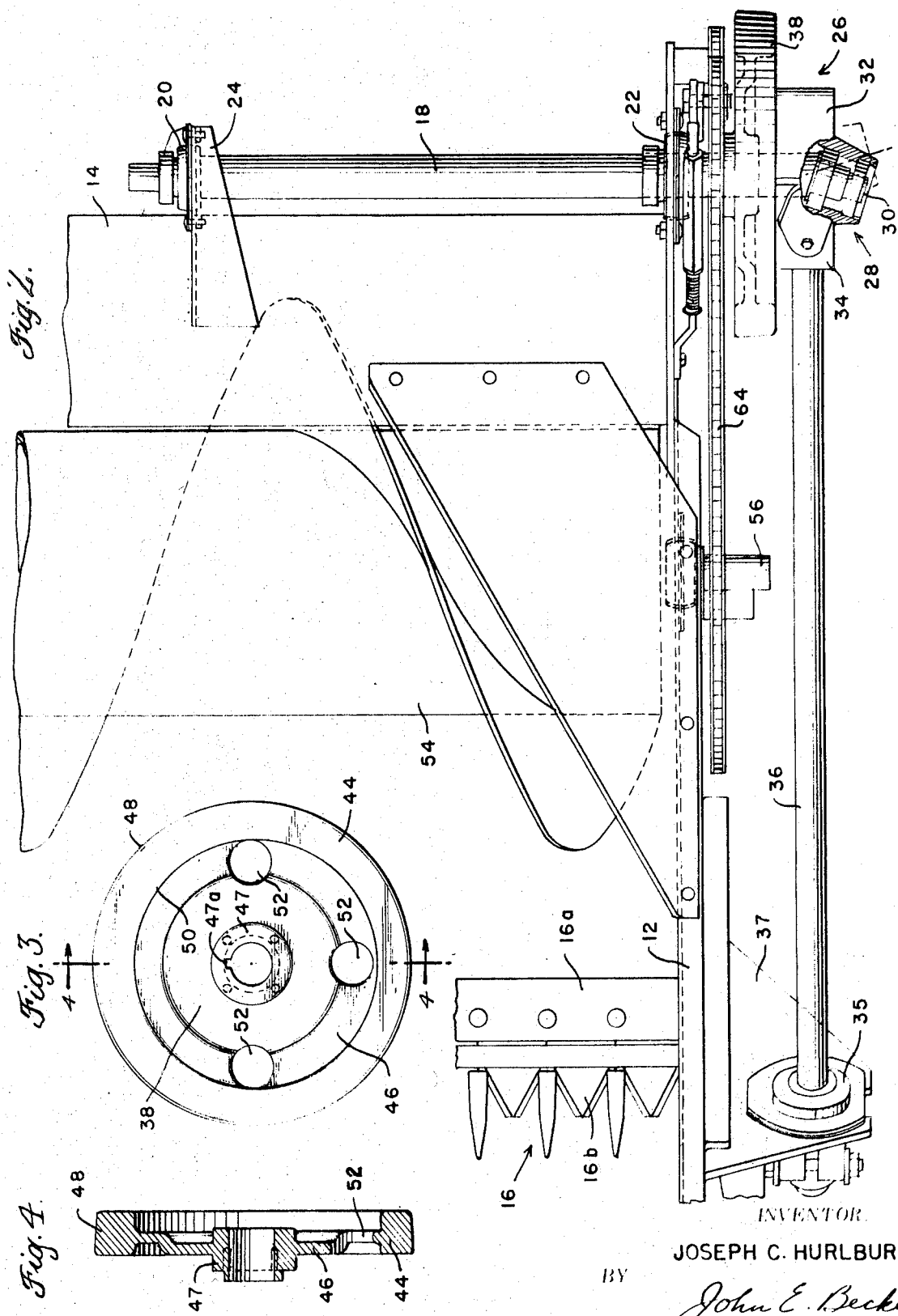

3,561,203
UNBALANCED WOBBLE DRIVE FLYWHEEL
Joseph C. Hurlburt, Leola, Pa., assignor to Sperry Rand Corporation, New Holland, Pa., a corporation of Delaware
Filed June 26, 1968, Ser. No. 740,315
Int. Cl. A01d 55/02
U.S. Cl. 56—296          2 Claims

ABSTRACT OF THE DISCLOSURE

An unbalanced wobble drive for a harvesting machine sickle comprised of a drive shaft rotatably supported on a machine header frame structure, a wobble drive unit connecting the drive shaft to a reciprocating sickle and an unbalanced flywheel mounted on the drive shaft rearwardly of the wobble drive unit, the unbalanced flywheel being adapted to counteract and dampen the vibrations transmitted to the machine header by the reciprocating sickle and the drive train.

BACKGROUND OF THE INVENTION

The pulsating loads imposed on the frames of harvesting machines by the inertial changes of reciprocating sickles tend to deflect these members and send vibrations throughout the machines. The resulting vibrations, if overly severe, could cause premature fatigue, undue wear, or increasingly noisy operation of the machine or the components thereof. All of these problems are well known in the art and farm machinery manufacturers have long applied various schemes and ideas in attempting to reduce or eliminate the vibrational forces. Some of the solutions have been more effective than others in dealing with these problems, but since the method of seeking the solutions have been compounded because each type of machine will create its own special type of vibration problem, there are very few solutions which can be universally applied.

The vibrational forces transmitted to machine frames by reciprocating sickles have caused substantial loading and stress problems in the frames in which they are mounted because of the high speed of reciprocation of the sickle within its constraining frame, the sickle mass, and because of additional forces created by the drive train. Generally speaking, manufacturers have dealt with these adverse vibrational characteristics by adding counterweights to the drive means and which reciprocate in the plane of the sickle, or in planes parallel to the plane of the sickle with the drive means. These counterweights swing 180 degrees out of phase with the sickle and by their mass they tend to dampen the vibrations created as the sickle is driven to the limit of its stroke in both directions.

This type of a solution has been successful on sickle or mower drives which have a rotary to oscillatory motion change mechanism disposed in close proximity to the sickle. When, however, the sickle is positioned at the lower portion of a harvesting machine header and the rotary to oscillatory driving means therefor is disposed on the header in an area remote from the sickle, the driving means also causes the addition of further vibrational forces to structural elements. The simple addition of a simple counterweight to this system will be ineffective to dampen vibration. The adition of a flywheel to the system to isolate power fluctuations, while they have had limited effectiveness, still will not completely solve the problem.

The addition of a balanced flywheel to the system has been applied to isolate power fluctuations created by overload of the sickle of such farm machinery. While this solution has been some what effective for that purpose, but the application has not substantially effected a vibration reduction in the system. In addition the application of the flywheel has proven very costly from a manufacturing standpoint inasmuch as a great deal of time and money must be expended to perform the delicate balancing operation. Other types of solutions have, therefore, been sought.

SUMMARY OF THE INVENTION

Accordingly, the present invention is designed to substantially reduce or eliminate the vibrational forces imposed on harvesting machine frames by the inertial changes of a reciprocating sickle mounted on the lower forward portion of a machine header of the type shown in U.S. Pat. No. 3,324,638, Koch et al. By this invention it is no longer possible to just isolate the vibrational forces but it is also possible to reduce or eliminate them altogether by installing an unbalanced drive means in the system. The system imbalance is created by a flywheel, which rotates with a drive shaft and is provided with a mass imbalance thereon. The mass distribution of the flywheel will effectively counteract the vibrational forces set up in the header over the entire limits of the sickle stroke as the flywheel rotates.

In addition to the reduction of the forces and vibrations, the present invention yields a device which is economical to manufacture because it requires no additional mass over a comparable balanced flywheel. The mass used in the unbalanced flywheel is merely redistributed during the flywheel fabrication to produce the imbalance.

The flywheel is also more economical to install on production equipment because its use results in the elimination of a costly balancing operation that has been heretofore effected to create the undesirable balancing condition.

BRIEF DESCRIPTION OF THE DRAWINGS

FIG. 1 is a side elevation of a harvesting machine header with the sickle drive constructed in accordance with the present invention mounted thereon;

FIG. 2 is an enlarged fragmentary plan view of FIG. 1;

FIG. 3 is a detail view of the unbalanced flywheel; and

FIG. 4 is a cross-sectional view taken along the vertical axis of line 4—4 of FIG. 3.

DESCRIPTION OF THE PRIMARY EMBODIMENT

Referring now to FIGS. 1 and 2, a harvesting machine header 10 is adapted to be mounted on a harvesting machine adapted to move forwardly over the ground G in the manner described in the aforementioned United States patent to Koch et al. While a specific type of sickle drive and header structure will be shown and described herein, it will be understood by those skilled in the art that the invention to be hereinafter described in detail is capable of being used on other types of sickle drives on other types of machine headers.

The header 10 is comprised, in part, of side frame structure 12 and rear frame structure 14. A reciprocating sickle 16 is mounted in the lower forward portion of header 10, just ahead of a ground engaging skid or shoe 17. The sickle 16, comprising a sickle bar portion 16a and knife portion 16b, extends across the header, from side to side, transverse to the direction of travel of the harvesting machine and is adapted to cut standing crop material as it moves forwardly over ground G. The sickle 16 also forms part of the header frame.

Mounted rearwardly of the header 10, along the upper portion of frame structure 14, is a drive shaft 18. The shaft is supported in bearings 20 and 22, as shown in FIG. 2, which are, in turn, supported in a bearing support 24 and side frame structure 12, respectively. The inward end of shaft 18, the end extending toward the center of header 10, is adapted to be connected to a suitable power source (not shown) by means (not shown), while the outer end extends through the side frame 12 and outwardly therefrom. The typical driving connection is shown in U.S. Pat. No. 3,324,638, Koch et al.

An unbalanced drive means 26, drivingly connected to the outwardly extending end of shaft 18, is comprised of a wobble drive unit 28, having a wobble shaft 30 adapted to transform a rotary input motion received from drive shaft 18 into an oscillating output motion, a yoke structure 32, extending around and connected to the wobble shaft 30 by arms 30a and 30b and drivingly connected at 34 to a fore-and-aft extending shaft 36 journalled in side frame 12 by a bearing 35 and support 37, and an unbalanced flywheel 38, mounted on drive shaft 18 between the side frame 12 of header 10 and wobble drive 28. Oscillatory motion is transferred from the wobble drive 28 to the shaft 36 from wobble shaft 30 through yoke structure 32. Shaft 36 extends between the wobble drive and a suitable means 40 forming a connection between the shaft 36 and a sickle drive rocker linkage 42. Through this drive train, rotary motion from input drive shaft 18 is transformed to an oscillating motion which is finally transmitted to the sickle 16 so that it is reciprocatingly driven back and forth across the harvester header to shear crop material.

The unbalanced flywheel 38, shown in detail in FIGS. 3 and 4, is provided with a rim portion 44 and a connecting web portion 46. The flywheel is adapted to be keyed to drive shaft 18 for rotation therewith by collar 47 and a keyway 47a. The outer edge 48 of the rim portion 44 is circular in configuration, concentric with the axis of rotation of shaft 18. The inner edge 50 of rim 44 is eccentric with respect to the axis of rotation and the outer edge 48 of the rim. The eccentric orientation of the inner edge portion 50 of rim 44 results in a rim having a variable width therearound, as seen in FIG. 3. This variation in the rim width is what produces the flywheel imbalance. The mass dispersal is such that, over a 180-degree section of the flywheel from the vertical axis of FIG. 3 (line 4—4), the rim width goes from a maximum to a minimum width (see FIGS. 3 and 4). To further establish a mass imbalance, a plurality of apertures 52 may be provided in web portion 46, about the axis of rotation of the flywheel, or the apertures positioned about the flywheel may be used as the only source mass imbalance, eliminating the need for imbalance in the rim portion.

The drive shaft 18 also serves to supply motive power to an auger 54, rotatably mounted in header 10 (see FIG. 2), through a drive train comprising, in part, a rotatable shaft 56, journalled transversely in side frame 12, a sprocket 58, drivingly connected to shaft 56, sprockets 60 and 62, rotatably mounted on shafts 61 and 63, respectively, and a driven chain 64, drivingly engageable by means not shown with drive shaft 18. As shaft 18 turns, the auger 54 is likewise caused to turn.

In operation, the wobble drive flywheel imbalance tends to reduce the forces that are imposed on the header support frame in the following manner. At the extremes of the sickle stroke, the sickle imposes a force couple on the wobble hub which is equal to a summation of the forces generated by the sickle and the drive train acting through the yoke structure 32. This force couple is counteracted by the forces acting on the bearings supporting the drive shaft 18, and the forces applied to the bearings by the header frame structure. If the flywheel were in perfect balance, then the forces applied to the bearings and to the frame structure would be equal. However, if the flywheel were provided with an imbalance generating a predetermined centrifugal force, then the summation of forces would indicate that the force applied by the frame structure to the bearings 20 and 22 would be reduced.

As the sickle traverses to the other end of its stroke, the wobble shaft will rotate 180 degrees and the imbalanced flywheel centrifugal force will once again offset the reversed inertial force couple. The imbalanced flywheel, because of the variable mass distribution will also generate its own frame support force requirements as the sickle nears the center of its stroke and the translated inertial loadings minimize.

A centrifugal force could be added that would impose greater frame forces and greater vibration than a balanced system, therefore, the magnitude of the centrifugal force must be developed so as to minimize the overall vibration if it is to be most effective. The benefits from the addition of the imbalance to the flywheel can be best realized when the wobble shaft support bearings are well separated. In this manner the bearing loads and the magnitude of the required imbalance are reduced.

While this invention has been described in connection with a particular embodiment thereof, it will be understood that it is capable of modification, and this application is intended to cover any variations, uses, or adaptations following, in general, the principles of the invention and including such departures from the present disclosure as come within the known or customary practice in the art to which this invention pertains, and as fall within the scope of the invention or the limits of the appended claims.

Having thus described my invention, what I claim is:
1. A sickle drive in a harvesting machine comprising, in combination, a header frame structure mounted forwardly of said harvesting machine and adapted to travel forwardly over the ground therewith, a reciprocating sickle supported on and extending transversely across the forward lower end of said header frame structure, a drive shaft rotatably journalled on said frame structure at the rearward end thereof extending parallel to said sickle, one end of said drive shaft terminating adjacent one side of said header frame and the other end of said drive shaft extending inwardly of said header frame side toward the center thereof, and an unbalanced drive means on said drive shaft connecting said drive shaft to said sickle, said unbalanced drive means including a wobble drive means on said shaft on the end terminating adjacent the side of said header frame for changing rotational motion to oscillatory motion, a fore-and-aft extending shaft journalled on said header frame on the same side of said frame as said wobble drive and having a rearward end connected to said wobble drive and a forward end connected to said sickle for transmitting motion thereto and an unbalanced flywheel mounted on said drive shaft for rotation therewith disposed rearwardly of said wobble drive and forwardly of said header frame, said flywheel having a rim portion of varying width and an interior web portion, said rim portion having an uneven mass distribution therearound whereby said inertially unbalanced flywheel dampens vibration transmitted to said header frame by said reciprocating sickle as said flywheel rotates on said drive shaft.

2. A sickle drive in a harvesting machine as recited in claim 1, wherein said inner web portion is provided with a plurality of apertures symmetrically disposed about the rotational axis of said flywheel, said apertures being disposed in a position remote from the widest portion of said rim.

References Cited
UNITED STATES PATENTS

| | | | |
|---|---|---|---|
| 2,428,924 | 10/1947 | Albertson | 56—296X |
| 2,769,297 | 11/1956 | Orelind et al. | 56—296X |
| 2,808,696 | 10/1957 | Hall | 56—296 |
| 3,324,638 | 6/1967 | Koch et al. | 56—23 |
| 3,401,611 | 9/1968 | Weakly et al. | 56—296 |

LOUIS G. MANCENE, Primary Examiner

J. A. OLIFF, Assistant Examiner

U.S. Cl. X.R.

74—574